(12) United States Patent
Sowards et al.

(10) Patent No.: US 12,514,532 B2
(45) Date of Patent: Jan. 6, 2026

(54) ULTRASOUND IMAGING SYSTEM

(71) Applicant: Bard Access Systems, Inc., Salt Lake City, UT (US)

(72) Inventors: Steffan Sowards, Salt Lake City, UT (US); William Robert McLaughlin, Bountiful, UT (US); Anthony K. Misener, Bountiful, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 0 days.

(21) Appl. No.: 17/684,180

(22) Filed: Mar. 1, 2022

(65) Prior Publication Data

US 2023/0277153 A1    Sep. 7, 2023

(51) Int. Cl.
*A61B 8/06* (2006.01)
*A61B 8/00* (2006.01)
*A61B 8/08* (2006.01)

(52) U.S. Cl.
CPC .............. *A61B 8/06* (2013.01); *A61B 8/0891* (2013.01); *A61B 8/4245* (2013.01); *A61B 8/4477* (2013.01); *A61B 8/4488* (2013.01); *A61B 8/463* (2013.01); *A61B 8/469* (2013.01); *A61B 8/488* (2013.01)

(58) Field of Classification Search
CPC ....... A61B 8/06; A61B 8/0891; A61B 8/4245; A61B 8/4477; A61B 8/4488; A61B 8/463; A61B 8/469; A61B 8/488
See application file for complete search history.

(56) References Cited

U.S. PATENT DOCUMENTS

| | | |
|---|---|---|
| 3,697,917 A | 10/1972 | Orth et al. |
| 5,148,809 A | 9/1992 | Biegeleisen-Knight et al. |
| 5,181,513 A | 1/1993 | Touboul et al. |
| 5,325,293 A | 6/1994 | Dorne |
| 5,349,865 A | 9/1994 | Kavli et al. |
| 5,441,052 A | 8/1995 | Miyajima |

(Continued)

FOREIGN PATENT DOCUMENTS

| | | |
|---|---|---|
| CN | 102871645 A | 1/2013 |
| CN | 105107067 B | 5/2018 |

(Continued)

OTHER PUBLICATIONS

Pagoulatos, N. et al. "New spatial localizer based on fiber optics with applications in 3D ultrasound imaging" Proceeding of Spie, vol. 3976 (Apr. 18, 2000; Apr. 18, 2000).

(Continued)

*Primary Examiner* — Kaitlyn E Sebastian
(74) *Attorney, Agent, or Firm* — Rutan & Tucker LLP

(57) ABSTRACT

Disclosed herein is an ultrasound imaging system configured to assess the impact of placement of a vascular access device on fluid flow through a target vessel. The ultrasound imaging system includes an ultrasound probe having an ultrasound array configured to capture one or more ultrasound images of the target vessel and a Doppler array configured to detect the fluid flow through a region of interest of the target vessel. The ultrasound imaging system further includes a console in communication with each of the ultrasound array and the Doppler array, the console configured to determine the region of interest of the target vessel.

13 Claims, 7 Drawing Sheets

(56) References Cited

U.S. PATENT DOCUMENTS

| | | |
|---|---|---|
| 5,549,554 A | 8/1996 | Miraki |
| 5,573,529 A | 11/1996 | Haak et al. |
| 5,758,650 A | 6/1998 | Miller et al. |
| 5,775,322 A | 7/1998 | Silverstein et al. |
| 5,879,297 A | 3/1999 | Haynor et al. |
| 5,897,503 A | 4/1999 | Lyon et al. |
| 5,908,387 A | 6/1999 | LeFree et al. |
| 5,967,984 A | 10/1999 | Chu et al. |
| 5,970,119 A | 10/1999 | Hofmann |
| 6,004,270 A | 12/1999 | Urbano et al. |
| 6,019,724 A | 2/2000 | Gronningsaeter et al. |
| 6,068,599 A | 5/2000 | Saito et al. |
| 6,074,367 A | 6/2000 | Hubbell |
| 6,129,668 A | 10/2000 | Haynor et al. |
| 6,132,379 A | 10/2000 | Patacsil et al. |
| 6,216,028 B1 | 4/2001 | Haynor et al. |
| 6,233,476 B1 | 5/2001 | Strommer et al. |
| 6,245,018 B1 | 6/2001 | Lee |
| 6,263,230 B1 | 7/2001 | Haynor et al. |
| 6,375,615 B1 | 4/2002 | Flaherty et al. |
| 6,436,043 B2 | 8/2002 | Bonnefous |
| 6,498,942 B1 | 12/2002 | Esenaliev et al. |
| 6,503,205 B2 | 1/2003 | Manor et al. |
| 6,508,769 B2 | 1/2003 | Bonnefous |
| 6,511,458 B2 | 1/2003 | Milo et al. |
| 6,524,249 B2 | 2/2003 | Moehring et al. |
| 6,543,642 B1 | 4/2003 | Milliorn |
| 6,554,771 B1 | 4/2003 | Buil et al. |
| 6,592,520 B1 | 7/2003 | Peszynski et al. |
| 6,592,565 B2 | 7/2003 | Twardowski |
| 6,601,705 B2 | 8/2003 | Molina et al. |
| 6,612,992 B1 | 9/2003 | Hossack et al. |
| 6,613,002 B1 | 9/2003 | Clark et al. |
| 6,623,431 B1 | 9/2003 | Sakuma et al. |
| 6,641,538 B2 | 11/2003 | Nakaya et al. |
| 6,647,135 B2 | 11/2003 | Bonnefous |
| 6,687,386 B1 | 2/2004 | Ito et al. |
| 6,733,458 B1 | 5/2004 | Steins et al. |
| 6,749,569 B1 | 6/2004 | Pellegretti |
| 6,754,608 B2 | 6/2004 | Svanerudh et al. |
| 6,755,789 B2 | 6/2004 | Stringer et al. |
| 6,840,379 B2 | 1/2005 | Franks-Farah et al. |
| 6,857,196 B2 | 2/2005 | Dalrymple |
| 6,979,294 B1 | 12/2005 | Selzer et al. |
| 7,074,187 B2 | 7/2006 | Selzer et al. |
| 7,244,234 B2 | 7/2007 | Ridley et al. |
| 7,359,554 B2 | 4/2008 | Klingensmith et al. |
| 7,534,209 B2 | 5/2009 | Abend et al. |
| 7,599,730 B2 | 10/2009 | Hunter et al. |
| 7,637,870 B2 | 12/2009 | Flaherty et al. |
| 7,681,579 B2 | 3/2010 | Schwartz |
| 7,691,061 B2 | 4/2010 | Hirota |
| 7,699,779 B2 | 4/2010 | Sasaki et al. |
| 7,720,520 B2 | 5/2010 | Willis |
| 7,727,153 B2 | 6/2010 | Fritz et al. |
| 7,734,326 B2 | 6/2010 | Pedain et al. |
| 7,831,449 B2 | 11/2010 | Ying et al. |
| 7,905,837 B2 | 3/2011 | Suzuki |
| 7,925,327 B2 | 4/2011 | Weese |
| 7,927,278 B2 | 4/2011 | Selzer et al. |
| 8,014,848 B2 | 9/2011 | Birkenbach et al. |
| 8,038,619 B2 | 10/2011 | Steinbacher |
| 8,060,181 B2 | 11/2011 | Rodriguez Ponce et al. |
| 8,075,488 B2 | 12/2011 | Burton |
| 8,090,427 B2 | 1/2012 | Eck et al. |
| 8,105,239 B2 | 1/2012 | Specht |
| 8,172,754 B2 | 5/2012 | Watanabe et al. |
| 8,175,368 B2 | 5/2012 | Sathyanarayana |
| 8,200,313 B1 | 6/2012 | Rambod et al. |
| 8,211,023 B2 | 7/2012 | Swan et al. |
| 8,228,347 B2 | 7/2012 | Beasley et al. |
| 8,298,147 B2 | 10/2012 | Huennekens et al. |
| 8,303,505 B2 | 11/2012 | Webler et al. |
| 8,323,202 B2 | 12/2012 | Roschak et al. |
| 8,328,727 B2 | 12/2012 | Miele et al. |
| 8,336,536 B1 | 12/2012 | Wood-Putnam et al. |
| 8,388,541 B2 | 3/2013 | Messerly et al. |
| 8,409,103 B2 | 4/2013 | Grunwald et al. |
| 8,449,465 B2 | 5/2013 | Nair et al. |
| 8,553,954 B2 | 10/2013 | Saikia |
| 8,556,815 B2 | 10/2013 | Pelissier et al. |
| 8,585,600 B2 | 11/2013 | Liu et al. |
| 8,622,913 B2 | 1/2014 | Dentinger et al. |
| 8,706,457 B2 | 4/2014 | Hart et al. |
| 8,727,988 B2 | 5/2014 | Flaherty et al. |
| 8,734,357 B2 | 5/2014 | Taylor |
| 8,744,211 B2 | 6/2014 | Owen |
| 8,754,865 B2 | 6/2014 | Merritt et al. |
| 8,764,663 B2 | 7/2014 | Smok et al. |
| 8,781,194 B2 | 7/2014 | Malek et al. |
| 8,781,555 B2 | 7/2014 | Burnside et al. |
| 8,790,263 B2 | 7/2014 | Randall et al. |
| 8,849,382 B2 | 9/2014 | Cox et al. |
| 8,939,908 B2 | 1/2015 | Suzuki et al. |
| 8,961,420 B2 | 2/2015 | Zhang |
| 9,022,940 B2 | 5/2015 | Meier |
| 9,087,147 B1 | 7/2015 | Fonte |
| 9,138,290 B2 | 9/2015 | Hadjicostis |
| 9,199,082 B1 | 12/2015 | Yared et al. |
| 9,204,858 B2 | 12/2015 | Pelissier et al. |
| 9,220,477 B2 | 12/2015 | Urabe et al. |
| 9,295,447 B2 | 3/2016 | Shah |
| 9,320,493 B2 | 4/2016 | Visveshwara |
| 9,357,980 B2 | 6/2016 | Toji et al. |
| 9,364,171 B2 | 6/2016 | Harris et al. |
| 9,427,207 B2 | 8/2016 | Sheldon et al. |
| 9,445,780 B2 | 9/2016 | Hossack et al. |
| 9,456,766 B2 | 10/2016 | Cox et al. |
| 9,456,804 B2 | 10/2016 | Tamada |
| 9,468,413 B2 | 10/2016 | Hall et al. |
| 9,492,097 B2 | 11/2016 | Wilkes et al. |
| 9,521,961 B2 | 12/2016 | Silverstein et al. |
| 9,554,716 B2 | 1/2017 | Burnside et al. |
| 9,582,876 B2 | 2/2017 | Specht |
| 9,610,061 B2 | 4/2017 | Ebbini et al. |
| 9,636,031 B2 | 5/2017 | Cox |
| 9,649,037 B2 | 5/2017 | Lowe et al. |
| 9,649,048 B2 | 5/2017 | Cox et al. |
| 9,702,969 B2 | 7/2017 | Hope Simpson et al. |
| 9,715,757 B2 | 7/2017 | Ng et al. |
| 9,717,415 B2 | 8/2017 | Cohen et al. |
| 9,731,066 B2 | 8/2017 | Liu et al. |
| 9,814,433 B2 | 11/2017 | Benishti et al. |
| 9,814,531 B2 | 11/2017 | Yagi et al. |
| 9,861,337 B2 | 1/2018 | Patwardhan et al. |
| 9,895,138 B2 | 2/2018 | Sasaki |
| 9,913,605 B2 | 3/2018 | Harris et al. |
| 9,949,720 B2 | 4/2018 | Southard et al. |
| 10,043,272 B2 | 8/2018 | Forzoni et al. |
| 10,449,330 B2 | 10/2019 | Newman et al. |
| 10,524,691 B2 | 1/2020 | Newman et al. |
| 10,751,509 B2 | 8/2020 | Misener |
| 11,564,861 B1 | 1/2023 | Gaines |
| 11,844,656 B2 | 12/2023 | Urabe et al. |
| 11,900,593 B2 | 2/2024 | Dhatt et al. |
| 12,082,976 B2 | 9/2024 | Urabe et al. |
| 2002/0038088 A1 | 3/2002 | Imran et al. |
| 2003/0047126 A1 | 3/2003 | Tomaschko |
| 2003/0106825 A1 | 6/2003 | Molina et al. |
| 2003/0109910 A1 | 6/2003 | Lachenbruch et al. |
| 2003/0120154 A1 | 6/2003 | Sauer et al. |
| 2003/0125629 A1 | 7/2003 | Ustuner |
| 2003/0135115 A1 | 7/2003 | Burdette et al. |
| 2003/0149366 A1 | 8/2003 | Stringer et al. |
| 2003/0167030 A1 | 9/2003 | Weitzel et al. |
| 2003/0216648 A1 | 11/2003 | Lizzi et al. |
| 2004/0015080 A1 | 1/2004 | Kelly et al. |
| 2004/0055925 A1 | 3/2004 | Franks-Farah et al. |
| 2004/0197267 A1 | 10/2004 | Black et al. |
| 2005/0000975 A1 | 1/2005 | Carco et al. |
| 2005/0049504 A1 | 3/2005 | Lo et al. |
| 2005/0075597 A1 | 4/2005 | Vournakis et al. |
| 2005/0165299 A1 | 7/2005 | Kressy et al. |
| 2005/0251030 A1 | 11/2005 | Azar et al. |

(56) References Cited

U.S. PATENT DOCUMENTS

| | | |
|---|---|---|
| 2005/0267365 A1 | 12/2005 | Sokulin et al. |
| 2006/0004290 A1 | 1/2006 | Smith et al. |
| 2006/0013523 A1 | 1/2006 | Childers et al. |
| 2006/0015039 A1 | 1/2006 | Cassidy et al. |
| 2006/0020204 A1 | 1/2006 | Serra et al. |
| 2006/0047617 A1 | 3/2006 | Bacioiu et al. |
| 2006/0079781 A1 | 4/2006 | Germond-Rouet et al. |
| 2006/0184029 A1 | 8/2006 | Haim et al. |
| 2006/0210130 A1 | 9/2006 | Germond-Rouet et al. |
| 2006/0241463 A1 | 10/2006 | Shau et al. |
| 2007/0043341 A1 | 2/2007 | Anderson et al. |
| 2007/0049822 A1 | 3/2007 | Bunce et al. |
| 2007/0073155 A1 | 3/2007 | Park et al. |
| 2007/0167738 A1 | 7/2007 | Timinger et al. |
| 2007/0199848 A1 | 8/2007 | Ellswood et al. |
| 2007/0239005 A1 | 10/2007 | Ogasawara |
| 2007/0239120 A1 | 10/2007 | Brock et al. |
| 2007/0249911 A1 | 10/2007 | Simon |
| 2007/0287886 A1 | 12/2007 | Saadat |
| 2008/0021322 A1 | 1/2008 | Stone et al. |
| 2008/0033293 A1 | 2/2008 | Beasley et al. |
| 2008/0033759 A1 | 2/2008 | Finlay |
| 2008/0051657 A1 | 2/2008 | Rold |
| 2008/0108930 A1* | 5/2008 | Weitzel ............... A61B 5/026 |
| | | 210/741 |
| 2008/0125651 A1 | 5/2008 | Watanabe et al. |
| 2008/0146915 A1 | 6/2008 | McMorrow |
| 2008/0177186 A1 | 7/2008 | Slater et al. |
| 2008/0221425 A1 | 9/2008 | Olson et al. |
| 2008/0269605 A1 | 10/2008 | Nakaya |
| 2008/0294037 A1 | 11/2008 | Richter |
| 2008/0300491 A1 | 12/2008 | Bonde et al. |
| 2009/0012399 A1 | 1/2009 | Sunagawa et al. |
| 2009/0012401 A1 | 1/2009 | Steinbacher |
| 2009/0074280 A1 | 3/2009 | Lu et al. |
| 2009/0105594 A1 | 4/2009 | Reynolds et al. |
| 2009/0118612 A1 | 5/2009 | Grunwald et al. |
| 2009/0124903 A1 | 5/2009 | Osaka |
| 2009/0137887 A1* | 5/2009 | Shariati ............. A61B 5/14542 |
| | | 600/345 |
| 2009/0137907 A1 | 5/2009 | Takimoto et al. |
| 2009/0143672 A1 | 6/2009 | Harms et al. |
| 2009/0143684 A1 | 6/2009 | Cermak et al. |
| 2009/0156926 A1 | 6/2009 | Messerly et al. |
| 2009/0281413 A1 | 11/2009 | Boyden et al. |
| 2009/0306509 A1 | 12/2009 | Pedersen et al. |
| 2010/0010348 A1 | 1/2010 | Halmann |
| 2010/0168576 A1 | 7/2010 | Poland et al. |
| 2010/0211026 A2 | 8/2010 | Sheetz et al. |
| 2010/0249598 A1 | 9/2010 | Smith et al. |
| 2010/0286515 A1 | 11/2010 | Gravenstein et al. |
| 2010/0312121 A1 | 12/2010 | Guan |
| 2010/0324423 A1 | 12/2010 | El-Aklouk et al. |
| 2011/0002518 A1 | 1/2011 | Ziv-Ari et al. |
| 2011/0026796 A1 | 2/2011 | Hyun et al. |
| 2011/0071404 A1 | 3/2011 | Schmitt et al. |
| 2011/0074244 A1 | 3/2011 | Osawa |
| 2011/0087107 A1 | 4/2011 | Lindekugel et al. |
| 2011/0166451 A1 | 7/2011 | Blaivas et al. |
| 2011/0282188 A1 | 11/2011 | Burnside et al. |
| 2011/0295108 A1 | 12/2011 | Cox et al. |
| 2011/0313293 A1 | 12/2011 | Lindekugel et al. |
| 2012/0136242 A1 | 5/2012 | Qi et al. |
| 2012/0136256 A1 | 5/2012 | Nozaki et al. |
| 2012/0143029 A1 | 6/2012 | Silverstein et al. |
| 2012/0165679 A1 | 6/2012 | Orome et al. |
| 2012/0179038 A1 | 7/2012 | Meurer et al. |
| 2012/0179042 A1 | 7/2012 | Fukumoto et al. |
| 2012/0179044 A1 | 7/2012 | Chiang et al. |
| 2012/0197132 A1 | 8/2012 | O'Connor |
| 2012/0220865 A1 | 8/2012 | Brown et al. |
| 2012/0277576 A1 | 11/2012 | Lui |
| 2013/0041250 A1 | 2/2013 | Pelissier et al. |
| 2013/0102889 A1 | 4/2013 | Southard et al. |
| 2013/0131499 A1 | 5/2013 | Chan et al. |
| 2013/0131502 A1 | 5/2013 | Blaivas et al. |
| 2013/0144166 A1* | 6/2013 | Specht ............... A61B 8/4488 |
| | | 600/441 |
| 2013/0150724 A1 | 6/2013 | Blaivas et al. |
| 2013/0188832 A1 | 7/2013 | Ma et al. |
| 2013/0197367 A1 | 8/2013 | Smok et al. |
| 2013/0218024 A1 | 8/2013 | Boctor et al. |
| 2013/0323700 A1 | 12/2013 | Samosky et al. |
| 2013/0338503 A1 | 12/2013 | Cohen et al. |
| 2013/0338508 A1 | 12/2013 | Nakamura et al. |
| 2013/0345566 A1 | 12/2013 | Weitzel et al. |
| 2014/0005530 A1 | 1/2014 | Liu et al. |
| 2014/0031694 A1 | 1/2014 | Solek |
| 2014/0066779 A1 | 3/2014 | Nakanishi |
| 2014/0073976 A1 | 3/2014 | Fonte et al. |
| 2014/0100440 A1 | 4/2014 | Cheline et al. |
| 2014/0114194 A1 | 4/2014 | Kanayama et al. |
| 2014/0170620 A1 | 6/2014 | Savitsky et al. |
| 2014/0180098 A1 | 6/2014 | Flaherty et al. |
| 2014/0180116 A1 | 6/2014 | Lindekugel et al. |
| 2014/0188133 A1 | 7/2014 | Misener |
| 2014/0188440 A1 | 7/2014 | Donhowe et al. |
| 2014/0276048 A1 | 9/2014 | Kiley et al. |
| 2014/0276059 A1 | 9/2014 | Sheehan |
| 2014/0276069 A1 | 9/2014 | Amble et al. |
| 2014/0276081 A1 | 9/2014 | Tegels |
| 2014/0276085 A1 | 9/2014 | Miller |
| 2014/0276690 A1 | 9/2014 | Grace |
| 2014/0296694 A1 | 10/2014 | Jaworski |
| 2014/0343431 A1 | 11/2014 | Vajinepalli et al. |
| 2014/0357994 A1 | 12/2014 | Jin et al. |
| 2015/0005738 A1 | 1/2015 | Blacker |
| 2015/0011887 A1 | 1/2015 | Ahn et al. |
| 2015/0065916 A1 | 3/2015 | Maguire et al. |
| 2015/0073279 A1 | 3/2015 | Cai et al. |
| 2015/0112200 A1 | 4/2015 | Oberg et al. |
| 2015/0141821 A1 | 5/2015 | Yoshikawa et al. |
| 2015/0190111 A1 | 7/2015 | Fry |
| 2015/0209003 A1 | 7/2015 | Halmann et al. |
| 2015/0209113 A1 | 7/2015 | Burkholz et al. |
| 2015/0209510 A1* | 7/2015 | Burkholz ............... H04N 5/44 |
| | | 604/93.01 |
| 2015/0209526 A1 | 7/2015 | Matsubara et al. |
| 2015/0245820 A1 | 9/2015 | Tamada |
| 2015/0257735 A1 | 9/2015 | Ball et al. |
| 2015/0272448 A1 | 10/2015 | Fonte et al. |
| 2015/0282890 A1 | 10/2015 | Cohen et al. |
| 2015/0294497 A1 | 10/2015 | Ng et al. |
| 2015/0297097 A1 | 10/2015 | Matsubara et al. |
| 2015/0342572 A1 | 12/2015 | Tahmasebi Maraghoosh et al. |
| 2015/0359520 A1 | 12/2015 | Shan et al. |
| 2015/0359991 A1 | 12/2015 | Dunbar et al. |
| 2016/0000367 A1* | 1/2016 | Lyon ............... A61B 8/5207 |
| | | 600/425 |
| 2016/0000399 A1 | 1/2016 | Halmann et al. |
| 2016/0026894 A1 | 1/2016 | Nagase |
| 2016/0029995 A1 | 2/2016 | Navratil et al. |
| 2016/0038119 A1 | 2/2016 | Desjardins |
| 2016/0081674 A1* | 3/2016 | Bagwan ............. A61B 10/0266 |
| | | 600/566 |
| 2016/0113517 A1 | 4/2016 | Lee et al. |
| 2016/0113699 A1 | 4/2016 | Sverdlik et al. |
| 2016/0120607 A1 | 5/2016 | Sorotzkin et al. |
| 2016/0125639 A1 | 5/2016 | Park et al. |
| 2016/0157831 A1 | 6/2016 | Kang et al. |
| 2016/0166232 A1 | 6/2016 | Merritt |
| 2016/0202053 A1 | 7/2016 | Walker et al. |
| 2016/0211045 A1 | 7/2016 | Jeon et al. |
| 2016/0213398 A1 | 7/2016 | Liu |
| 2016/0220124 A1 | 8/2016 | Grady et al. |
| 2016/0259992 A1 | 9/2016 | Knodt et al. |
| 2016/0278869 A1 | 9/2016 | Grunwald |
| 2016/0287214 A1 | 10/2016 | Ralovich et al. |
| 2016/0296208 A1 | 10/2016 | Sethuraman et al. |
| 2016/0374644 A1 | 12/2016 | Mauldin, Jr. et al. |
| 2017/0014105 A1 | 1/2017 | Chono |
| 2017/0020561 A1 | 1/2017 | Cox et al. |
| 2017/0079548 A1 | 3/2017 | Silverstein et al. |
| 2017/0086785 A1 | 3/2017 | Bjaerum |

(56) References Cited

U.S. PATENT DOCUMENTS

| | | |
|---|---|---|
| 2017/0090571 A1 | 3/2017 | Bjaerum et al. |
| 2017/0103534 A1* | 4/2017 | Park .................. A61B 8/4472 |
| 2017/0143312 A1 | 5/2017 | Hedlund et al. |
| 2017/0164923 A1 | 6/2017 | Matsumoto |
| 2017/0172666 A1 | 6/2017 | Govari et al. |
| 2017/0215842 A1 | 8/2017 | Ryu et al. |
| 2017/0231553 A1 | 8/2017 | Igarashi et al. |
| 2017/0252004 A1 | 9/2017 | Broad et al. |
| 2017/0258522 A1 | 9/2017 | Goshgarian et al. |
| 2017/0259013 A1 | 9/2017 | Boyden et al. |
| 2017/0328751 A1 | 11/2017 | Lemke |
| 2017/0367678 A1 | 12/2017 | Sirtori et al. |
| 2018/0015256 A1* | 1/2018 | Southard ............... A61B 8/0841 |
| 2018/0116723 A1 | 5/2018 | Hettrick et al. |
| 2018/0125450 A1 | 5/2018 | Blackbourne et al. |
| 2018/0161502 A1 | 6/2018 | Nanan et al. |
| 2018/0199914 A1 | 7/2018 | Ramachandran et al. |
| 2018/0214119 A1 | 8/2018 | Mehrmohammadi et al. |
| 2018/0228465 A1 | 8/2018 | Southard et al. |
| 2018/0235649 A1 | 8/2018 | Elkadi |
| 2018/0235709 A1 | 8/2018 | Donhowe et al. |
| 2018/0289927 A1 | 10/2018 | Messerly |
| 2018/0296185 A1 | 10/2018 | Cox et al. |
| 2018/0310955 A1 | 11/2018 | Lindekugel et al. |
| 2018/0333135 A1 | 11/2018 | Kim et al. |
| 2018/0344293 A1 | 12/2018 | Raju et al. |
| 2019/0029636 A1 | 1/2019 | Lee et al. |
| 2019/0060001 A1 | 2/2019 | Kohli et al. |
| 2019/0060014 A1 | 2/2019 | Hazelton et al. |
| 2019/0090855 A1 | 3/2019 | Kobayashi et al. |
| 2019/0125210 A1 | 5/2019 | Govari et al. |
| 2019/0200951 A1 | 7/2019 | Meier |
| 2019/0239848 A1 | 8/2019 | Bedi et al. |
| 2019/0239850 A1 | 8/2019 | Dalvin et al. |
| 2019/0307419 A1 | 10/2019 | Durfee |
| 2019/0307515 A1 | 10/2019 | Naito et al. |
| 2019/0307516 A1 | 10/2019 | Schotzko et al. |
| 2019/0365347 A1 | 12/2019 | Abe |
| 2019/0365348 A1 | 12/2019 | Toume et al. |
| 2019/0365354 A1 | 12/2019 | Du |
| 2020/0027210 A1 | 1/2020 | Haemel et al. |
| 2020/0069929 A1* | 3/2020 | Mason ................ A61M 1/3661 |
| 2020/0107596 A1 | 4/2020 | Caruso et al. |
| 2020/0113540 A1 | 4/2020 | Gijsbers et al. |
| 2020/0163654 A1 | 5/2020 | Satir et al. |
| 2020/0200900 A1* | 6/2020 | Asami .................. A61B 8/06 |
| 2020/0229795 A1 | 7/2020 | Tadross et al. |
| 2020/0230391 A1 | 7/2020 | Burkholz et al. |
| 2020/0237403 A1 | 7/2020 | Southard et al. |
| 2020/0281563 A1 | 9/2020 | Muller et al. |
| 2020/0359990 A1 | 11/2020 | Poland et al. |
| 2020/0390416 A1 | 12/2020 | Swan et al. |
| 2021/0045716 A1* | 2/2021 | Shiran .................. G06T 7/246 |
| 2021/0059639 A1 | 3/2021 | Howell |
| 2021/0077058 A1 | 3/2021 | Mashood et al. |
| 2021/0093383 A1 | 4/2021 | Wang et al. |
| 2021/0137492 A1 | 5/2021 | Imai |
| 2021/0146167 A1 | 5/2021 | Barthe et al. |
| 2021/0161510 A1 | 6/2021 | Sasaki et al. |
| 2021/0186467 A1 | 6/2021 | Urabe et al. |
| 2021/0212658 A1 | 7/2021 | McGrath et al. |
| 2021/0212668 A1 | 7/2021 | Li et al. |
| 2021/0267569 A1* | 9/2021 | Yamamoto ........... A61B 8/5246 |
| 2021/0267570 A1 | 9/2021 | Ulman et al. |
| 2021/0295048 A1 | 9/2021 | Buras et al. |
| 2021/0315538 A1 | 10/2021 | Brandl et al. |
| 2021/0373602 A1 | 12/2021 | Min |
| 2021/0378627 A1 | 12/2021 | Yarmush et al. |
| 2022/0019313 A1 | 1/2022 | He et al. |
| 2022/0022969 A1 | 1/2022 | Misener |
| 2022/0039777 A1 | 2/2022 | Durfee |
| 2022/0039829 A1 | 2/2022 | Zijlstra et al. |
| 2022/0071593 A1 | 3/2022 | Tran |
| 2022/0096053 A1 | 3/2022 | Sethuraman et al. |
| 2022/0096797 A1 | 3/2022 | Prince |
| 2022/0104791 A1 | 4/2022 | Matsumoto |
| 2022/0104886 A1 | 4/2022 | Blanchard et al. |
| 2022/0117582 A1 | 4/2022 | McLaughlin et al. |
| 2022/0160434 A1 | 5/2022 | Messerly et al. |
| 2022/0168050 A1 | 6/2022 | Sowards et al. |
| 2022/0172354 A1 | 6/2022 | Misener et al. |
| 2022/0225963 A1 | 7/2022 | Sutton et al. |
| 2022/0233346 A1 | 7/2022 | McElya |
| 2022/0296303 A1 | 9/2022 | McLeod et al. |
| 2022/0304652 A1 | 9/2022 | Peterson et al. |
| 2022/0330922 A1 | 10/2022 | Sowards et al. |
| 2022/0334251 A1 | 10/2022 | Sowards et al. |
| 2022/0361840 A1 | 11/2022 | Matsumoto et al. |
| 2023/0048327 A1 | 2/2023 | Lampe et al. |
| 2023/0107629 A1 | 4/2023 | Sowards et al. |
| 2023/0113291 A1 | 4/2023 | de Wild et al. |
| 2023/0132148 A1 | 4/2023 | Sowards et al. |
| 2023/0135562 A1 | 5/2023 | Misener et al. |
| 2023/0135757 A1 | 5/2023 | Bauer et al. |
| 2023/0138970 A1 | 5/2023 | Sowards et al. |
| 2023/0148872 A1 | 5/2023 | Sowards et al. |
| 2023/0277154 A1 | 9/2023 | Sowards et al. |
| 2023/0293143 A1 | 9/2023 | Sowards et al. |
| 2023/0298757 A1 | 9/2023 | Golan et al. |
| 2023/0338010 A1* | 10/2023 | Sturm .................. A61B 8/54 |
| 2023/0371928 A1 | 11/2023 | Rajguru et al. |
| 2023/0397900 A1 | 12/2023 | Prince |
| 2024/0065673 A1 | 2/2024 | Sowards et al. |
| 2024/0307024 A1 | 9/2024 | Sowards et al. |
| 2025/0017559 A1 | 1/2025 | Denny et al. |
| 2025/0057501 A1 | 2/2025 | Prince |
| 2025/0104238 A1 | 3/2025 | Misener et al. |
| 2025/0177060 A1 | 6/2025 | Messerly et al. |
| 2025/0186026 A1 | 6/2025 | Tran |
| 2025/0251511 A1 | 8/2025 | Sowards et al. |

FOREIGN PATENT DOCUMENTS

| | | | |
|---|---|---|---|
| EP | 0933063 A1 | 8/1999 | |
| EP | 1504713 A1 | 2/2005 | |
| EP | 1591074 B1 | 5/2008 | |
| EP | 2823766 A1 | 1/2015 | |
| EP | 3181083 A1 | 6/2017 | |
| EP | 3870059 | 9/2021 | |
| JP | 2000271136 A | 10/2000 | |
| JP | 2007222291 A | 9/2007 | |
| JP | 2014150928 A | 8/2014 | |
| JP | 2018175547 A | 11/2018 | |
| KR | 20180070878 A | 6/2018 | |
| KR | 102176196 B1 | 11/2020 | |
| WO | 2004082749 A2 | 9/2004 | |
| WO | 2007115174 A2 | 10/2007 | |
| WO | 2010029521 A2 | 3/2010 | |
| WO | 2010076808 A1 | 7/2010 | |
| WO | 2013059714 A1 | 4/2013 | |
| WO | 2014/115150 A1 | 7/2014 | |
| WO | 2015/017270 A1 | 2/2015 | |
| WO | 2016/081023 A1 | 5/2016 | |
| WO | 2017096487 A1 | 6/2017 | |
| WO | 2017214428 A1 | 12/2017 | |
| WO | 2018/026878 A1 | 2/2018 | |
| WO | 2018134726 A1 | 7/2018 | |
| WO | 2018138343 A1 | 8/2018 | |
| WO | 2019/232451 A1 | 12/2019 | |
| WO | 2020/002620 A1 | 1/2020 | |
| WO | 2020/016018 A1 | 1/2020 | |
| WO | 2019/232454 A9 | 2/2020 | |
| WO | 2020/044769 A1 | 3/2020 | |
| WO | 2020067897 A1 | 4/2020 | |
| WO | 2020083660 A1 | 4/2020 | |
| WO | 2020/186198 A1 | 9/2020 | |
| WO | WO-2021123905 A2 * | 6/2021 | ........... A61B 8/0891 |
| WO | 2021198226 A1 | 10/2021 | |
| WO | 2022/072727 A2 | 4/2022 | |
| WO | 2022/081904 A1 | 4/2022 | |
| WO | 2022069208 A1 | 4/2022 | |
| WO | 2022/119853 A1 | 6/2022 | |
| WO | 2022115479 A1 | 6/2022 | |
| WO | 2022119856 A1 | 6/2022 | |

(56) References Cited

FOREIGN PATENT DOCUMENTS

| WO | 2022/221703 A1 | 10/2022 |
|---|---|---|
| WO | 2022/221714 A1 | 10/2022 |
| WO | 2023059512 A1 | 4/2023 |
| WO | 2023076268 A1 | 5/2023 |
| WO | 2023081220 A1 | 5/2023 |
| WO | 2023081223 A1 | 5/2023 |
| WO | 2023091424 A1 | 5/2023 |
| WO | 2023167866 A1 | 9/2023 |
| WO | 2023177718 A1 | 9/2023 |
| WO | 2024044277 A1 | 2/2024 |
| WO | 2024180503 A1 | 9/2024 |
| WO | 2025015198 A1 | 1/2025 |

OTHER PUBLICATIONS

PCT/US2022/025082 filed Apr. 15, 2022 International Search Report and Written Opinion dated Jul. 11, 2022.
PCT/US2022/025097 filed Apr. 15, 2022 International Search Report and Written Opinion dated Jul. 8, 2022.
U.S. Appl. No. 17/020,476, filed Sep. 14, 2020 Advisory Action dated Aug. 19, 2022.
U.S. Appl. No. 17/020,476, filed Sep. 14, 2020 Final Office Action dated Jun. 9, 2022.
U.S. Appl. No. 17/471,015, filed Sep. 9, 2021 Non-Final Office Action dated Aug. 16, 2022.
PCT/US2022047727 filed Oct. 25, 2022 International Search Report and Written Opinion dated Jan. 25, 2023.
U.S. Appl. No. 17/020,476, filed Sep. 14, 2020 Final Office Action dated Jan. 5, 2023.
U.S. Appl. No. 17/020,476, filed Sep. 14, 2020 Non-Final Office Action dated Sep. 23, 2022.
PCT/US2023/014143 filed Feb. 28, 2023 International Search Report and Written Opinion dated Jun. 12, 2023.
PCT/US2023/015266 filed Mar. 15, 2023 International Search Report and Written Opinion dated May 25, 2023.
PCT/US2022/048716 filed Nov. 2, 2022 International Search Report and Written Opinion dated Feb. 24, 2023.
PCT/US2022/048722 filed Nov. 2, 2022 International Search Report and Written Opinion dated Feb. 24, 2023.
PCT/US2022/049983 filed Nov. 15, 2022 International Search Report and Written Opinion dated Mar. 29, 2023.
Saxena Ashish et al Thermographic venous blood flow characterization with external cooling stimulation Infrared Physics and Technology Elsevier Science GB vol. 90 Feb. 9, 2018 Feb. 9, 2018 pp. 8-19 XP085378852.
U.S. Appl. No. 17/020,476, filed Sep. 14, 2020 Notice of Allowance dated Apr. 28, 2022.
U.S. Appl. No. 17/468,318, filed Sep. 7, 2021 Non-Final Office Action dated Apr. 12, 2023.
U.S. Appl. No. 17/471,015, filed Sep. 9, 2021 Non-Final Office Action dated Mar. 30, 2023.
U.S. Appl. No. 17/534,099, filed Nov. 23, 2021 Non-Final Office Action dated Mar. 31, 2023.
U.S. Appl. No. 17/538,911, filed Nov. 30, 2021 Non-Final Office Action dated Mar. 2, 2023.
Lu Zhenyu et al "Recent advances in 5 robot-assisted echography combining perception control and cognition." Cognitive Computation and Systems the Institution of Engineering and Technology, Michael Faraday House, Six Hills Way, Stevenage Herts. SG1 2AY UK vol. 2 No. 3 Sep. 2, 2020 (Sep. 2, 2020).
PCT/US2012/061182 International Seach Report and Written Opinion dated Mar. 11, 2013.
PCT/US2021/045218 filed Aug. 9, 2021 International Search Report and Written Opinion dated Nov. 23, 2021.
PCT/US2021/049123 filed Sep. 3, 2021 International Search Report and Written Opinion dated Feb. 4, 2022.
PCT/US2021/049123 filed Sep. 3, 2021 International Search Report and Written Opinion dated May 16, 2022.
PCT/US2021/049294 filed Sep. 7, 2021 International Search Report and Written Opinion dated Dec. 8, 2021.
PCT/US2021/049712 filed Sep. 9, 2021 International Search Report and Written Opinion dated Dec. 14, 2021.
PCT/US2021/052055 filed Sep. 24, 2021 International Search Report and Written Opinion dated Dec. 20, 2021.
PCT/US2021/053018 filed Sep. 30, 2021 International Search Report and Written Opinion dated May 3, 2022.
PCT/US2021/060622 filed Nov. 23, 2021 International Search Report and Written Opinion dated Mar. 3, 2022.
PCT/US2021/061267 filed Nov. 30, 2021 International Search Report and Written Opinion dated Mar. 9, 2022.
PCT/US2021/061276 filed Nov. 30, 2021 International Search Report and Written Opinion dated Mar. 9, 2022.
Sebastian Vogt: "Real-Time Augmented Reality for Image-Guided Interventions", Oct. 5, 2009, XPO55354720, Retrieved from the Internet: URL: https://opus4.kobv.de/opus4-fau/frontdoor/deliver/index/docId/1235/file/SebastianVogtDissertation.pdf.
U.S. Appl. No. 13/656,563, filed Oct. 19, 2012 Decision on Appeal dated Nov. 1, 2017.
U.S. Appl. No. 13/656,563, filed Oct. 19, 2012 Examiner's Answer dated Nov. 16, 2015.
U.S. Appl. No. 13/656,563, filed Oct. 19, 2012 Final Office Action dated Dec. 5, 2014.
U.S. Appl. No. 13/656,563, filed Oct. 19, 2012 Non-Final Office Action dated Jul. 18, 2014.
U.S. Appl. No. 15/650,474, filed Jul. 14, 2017 Final Office Action dated Jun. 2, 2020.
U.S. Appl. No. 15/650,474, filed Jul. 14, 2017 Non-Final Office Action dated Dec. 16, 2019.
U.S. Appl. No. 15/650,474, filed Jul. 14, 2017 Notice of Allowance dated Dec. 11, 2020.
U.S. Appl. No. 15/650,474, filed Jul. 14, 2017 Notice of Allowance dated Mar. 1, 2021.
U.S. Appl. No. 15/951,903, filed Apr. 12, 2018 Advisory Action dated Dec. 22, 2020.
U.S. Appl. No. 15/951,903, filed Apr. 12, 2018 Board Decision dated Apr. 20, 2022.
U.S. Appl. No. 15/951,903, filed Apr. 12, 2018 Examiner's Answer dated Jun. 3, 2021.
U.S. Appl. No. 15/951,903, filed Apr. 12, 2018 Final Office Action dated Oct. 13, 2020.
U.S. Appl. No. 15/951,903, filed Apr. 12, 2018 Non-Final Office Action dated May 22, 2020.
U.S. Appl. No. 15/951,903, filed Apr. 12, 2018 Notice of Allowance dated May 2, 2022.
U.S. Appl. No. 17/020,476, filed Sep. 14, 2020 Non-Final Office Action dated Feb. 9, 2022.
William F Garrett et al: "Real-time incremental visualization of dynamic ultrasound volumes using parallel BSP trees", Visualization '96. Proceedings, IEEE, NE, Oct. 27, 1996, pp. 235-ff, XPO58399771, ISBN: 978-0-89791-864-0 abstract, figures 1-7, pp. 236-240.
EP 20866520.8 filed Apr. 5, 2022 Extended European Search Report dated Aug. 22, 2023.
PCT/US2022/025097 filed Apr. 15, 2021 International Preliminary Report on Patentability dated Oct. 26, 2023.
U.S. Appl. No. 17/468,318, filed Sep. 7, 2021 Final Office Action dated Sep. 8, 2023.
U.S. Appl. No. 17/471,015, filed Sep. 9, 2021 Final Office Action dated Oct. 12, 2023.
U.S. Appl. No. 17/534,099, filed Nov. 23, 2021 Final Office Action dated Sep. 29, 2023.
U.S. Appl. No. 17/538,911, filed Nov. 30, 2021 Final Office Action dated Sep. 13, 2023.
U.S. Appl. No. 17/722,151, filed Apr. 15, 2022 Non-Final Office Action dated Sep. 7, 2023.
PCT/US2023/030970 filed Aug. 23, 2023 International Search Report and Written Opinion dated Oct. 30, 2023.
U.S. Appl. No. 17/468,318, filed Sep. 7, 2021 Advisory Action dated Nov. 6, 2023.
U.S. Appl. No. 17/468,318, filed Sep. 7, 2021 Notice of Allowance dated Jan. 18, 2024.

(56) References Cited

OTHER PUBLICATIONS

U.S. Appl. No. 17/534,099, filed Nov. 23, 2021 Advisory Action dated Dec. 8, 2023.
U.S. Appl. No. 17/538,911, filed Nov. 30, 2021 Advisory Action dated Nov. 22, 2023.
U.S. Appl. No. 17/722,111, filed Apr. 15, 2022 Non-Final Office Action dated Dec. 22, 2023.
U.S. Appl. No. 17/722,151, filed Apr. 15, 2022 Advisory Action dated Jan. 2, 2024.
U.S. Appl. No. 17/722,151, filed Apr. 15, 2022 Final Office Action dated Nov. 6, 2023.
U.S. Appl. No. 17/894,460, filed Aug. 24, 2022 Non-Final Office Action dated Nov. 6, 2023.
M. Ikhsan, K. K. Tan, AS. Putra, C. F. Kong, et. al., "Automatic identification of blood vessel cross-section for central venous catheter placement using a cascading classifier," 39th Annual International Conference of the IEEE Engineering in Medicine and Biology Society (EMBC). pp. 1489-1492 (Year: 2017).
U.S. Appl. No. 17/471,015, filed Sep. 9, 2021 Advisory Action dated Feb. 2, 2024.
U.S. Appl. No. 17/471,015, filed Sep. 9, 2021 Non-Final Office Action dated Mar. 28, 2024.
U.S. Appl. No. 17/534,099, filed Nov. 23, 2021 Non-Final Office Action dated Mar. 14, 2024.
U.S. Appl. No. 17/538,911, filed Nov. 30, 2021 Notice of Allowance dated Mar. 14, 2024.
U.S. Appl. No. 17/538,943, filed Nov. 30, 2021 Non-Final Office Action dated Jan. 30, 2024.
U.S. Appl. No. 17/722,151, filed Apr. 15, 2022 Non-Final Office Action dated Mar. 25, 2024.
U.S. Appl. No. 17/894,460, filed Aug. 24, 2022 Advisory Action dated Apr. 4, 2024.
U.S. Appl. No. 17/894,460, filed Aug. 24, 2022 Final Office Action dated Jan. 31, 2024.
U.S. Appl. No. 18/238,281, filed Aug. 25, 2023 Non-Final Office Action dated Mar. 22, 2024.
PCT/US2022/045372 filed Sep. 30, 2022 International Search Report and Written Opinion dated Jan. 14, 2023.
U.S. Appl. No. 17/722,111, filed Apr. 15, 2022 Final Office Action dated Jul. 12, 2024.
U.S. Appl. No. 17/957,562, filed Sep. 30, 2022 Non-Final Office Action dated Jun. 20, 2024.
U.S. Appl. No. 17/979,564, filed Nov. 2, 2022 Non-Final Office Action dated Jun. 5, 2024.
U.S. Appl. No. 18/238,281, filed Aug. 25, 2023 Notice of Allowance dated Jul. 16, 2024.
PCT/US2024/037647 filed Jul. 11, 2024 International Search Report and Written Opinion dated Oct. 16, 2024.
Thermographic venous blood flow characterization with external cooling stimulation (Year: 2018).
U.S. Appl. No. 17/471,015, filed Sep. 9, 2021 Notice of Allowance dated Oct. 29, 2024.
U.S. Appl. No. 17/534,099, filed Nov. 23, 2021 Notice of Allowance dated Sep. 18, 2024.
U.S. Appl. No. 17/538,943, filed Nov. 30, 2021 Notice of Allowance dated Aug. 14, 2024.
U.S. Appl. No. 17/722,111, filed Apr. 15, 2022 Advisory Action dated Oct. 23, 2024.
U.S. Appl. No. 17/722,151, filed Apr. 15, 2022 Final Office Action dated Sep. 20, 2024.
U.S. Appl. No. 17/894,460, filed Aug. 24, 2022 Non-Final Office Action dated Sep. 25, 2024.
U.S. Appl. No. 17/979,564, filed Nov. 2, 2022 Final Office Action dated Oct. 18, 2024.
U.S. Appl. No. 17/979,601, filed Nov. 2, 2022 Non-Final Office Action dated Aug. 20, 2024.
U.S. Appl. No. 17/987,698, filed Nov. 15, 2022 Non-Final Office Action dated Sep. 20, 2024.
U.S. Appl. No. 17/722,111, filed Apr. 15, 2022 Notice of Allowance dated Dec. 18, 2024.
U.S. Appl. No. 17/722,151, filed Apr. 15, 2022 Advisory Action dated Dec. 27, 2024.
U.S. Appl. No. 17/894,460, filed Aug. 24, 2022 Final Office Action dated Dec. 31, 2024.
U.S. Appl. No. 17/957,562, filed Sep. 30, 2022 Final Office Action dated Nov. 27, 2024.
U.S. Appl. No. 17/973,171, filed Oct. 25, 2022 Non-Final Office Action dated Dec. 6, 2024.
U.S. Appl. No. 17/979,601, filed Nov. 2, 2022 Final Office Action dated Dec. 5, 2024.
U.S. Appl. No. 17/987,698, filed Nov. 15, 2022 Final Office Action dated Dec. 13, 2024.
U.S. Appl. No. 18/113,003, filed Feb. 22, 2023 Non-Final Office Action dated Nov. 27, 2024.
U.S. Appl. No. 18/121,802, filed Mar. 15, 2023 Non-Final Office Action dated Dec. 16, 2024.
U.S. Appl. No. 17/722,151, filed Apr. 15, 2022 Non-Final Office Action dated Mar. 21, 2025.
U.S. Appl. No. 17/894,460, filed Aug. 24, 2022 Advisory Action dated Mar. 13, 2025.
U.S. Appl. No. 17/957,562, filed Sep. 30, 2022 Advisory Action dated Feb. 12, 2025.
U.S. Appl. No. 17/973,171, filed Oct. 25, 2022 Final Office Action dated Apr. 3, 2025.
U.S. Appl. No. 17/979,564, filed Nov. 2, 2022 Advisory Action dated Jan. 17, 2025.
U.S. Appl. No. 17/979,601, filed Nov. 2, 2022 Advisory Action dated Feb. 11, 2025.
U.S. Appl. No. 17/979,601, filed Nov. 2, 2022 Notice of Allowance dated Mar. 27, 2025.
U.S. Appl. No. 17/987,698, filed Nov. 15, 2022 Advisory Action dated Feb. 21, 2025.
U.S. Appl. No. 18/221,318, filed Jul. 12, 2023 Restriction Requirement dated Mar. 28, 2025.
U.S. Appl. No. 18/674,601, filed May 24, 2024 Non-Final Office Action dated Jan. 7, 2025.
U.S. Appl. No. 18/674,601, filed May 24, 2024 Notice of Allowance dated Mar. 26, 2025.
Chen et al., 3D near infrared and ultrasound imaging of peripheral blood vessels for real-time localization and needle guidance. InMedical Image Computing and Computer-Assisted Intervention—MICCAI 2016 (pp. 388-396) (Year: 2016).
U.S. Appl. No. 17/722,151, filed Apr. 15, 2022 Final Office Action dated Jul. 11, 2025.
U.S. Appl. No. 17/957,562, filed Sep. 30, 2022 Examiner's Answer dated Jun. 16, 2025.
U.S. Appl. No. 17/973,171, filed Oct. 25, 2022 Advisory Action dated Jun. 30, 2025.
U.S. Appl. No. 17/979,564, filed Nov. 2, 2022 Examiner's Answer dated May 30, 2025.
U.S. Appl. No. 17/987,698, filed Nov. 15, 2022 Non-Final Office Action dated May 23, 2025.
U.S. Appl. No. 18/113,003, filed Feb. 22, 2023 Advisory Action dated Jul. 2, 2025.
U.S. Appl. No. 18/113,003, filed Feb. 22, 2023 Final Office Action dated Apr. 29, 2025.
U.S. Appl. No. 18/121,802, filed Mar. 15, 2023 Notice of Allowance dated Jun. 5, 2025.
U.S. Appl. No. 18/221,318, filed Jul. 12, 2023 Non-Final Office Action dated Jun. 23, 2025.
Konica Minolta, "Vascular NAVI" product website. https://www.konicaminolta.com/global-en/healthcare/technology/ultrasound/vascularnavi/index.html. Last accessed Jun. 2025.
U.S. Appl. No. 17/894,460, filed Aug. 24, 2022 Examiner's Answer dated October2, 2025.
U.S. Appl. No. 17/987,698, filed Nov. 15, 2022 Final Office Action dated Sep. 12, 2025.
U.S. Appl. No. 18/113,003, filed Feb. 22, 2023 Notice of Allowance dated Aug. 15, 2025.

\* cited by examiner

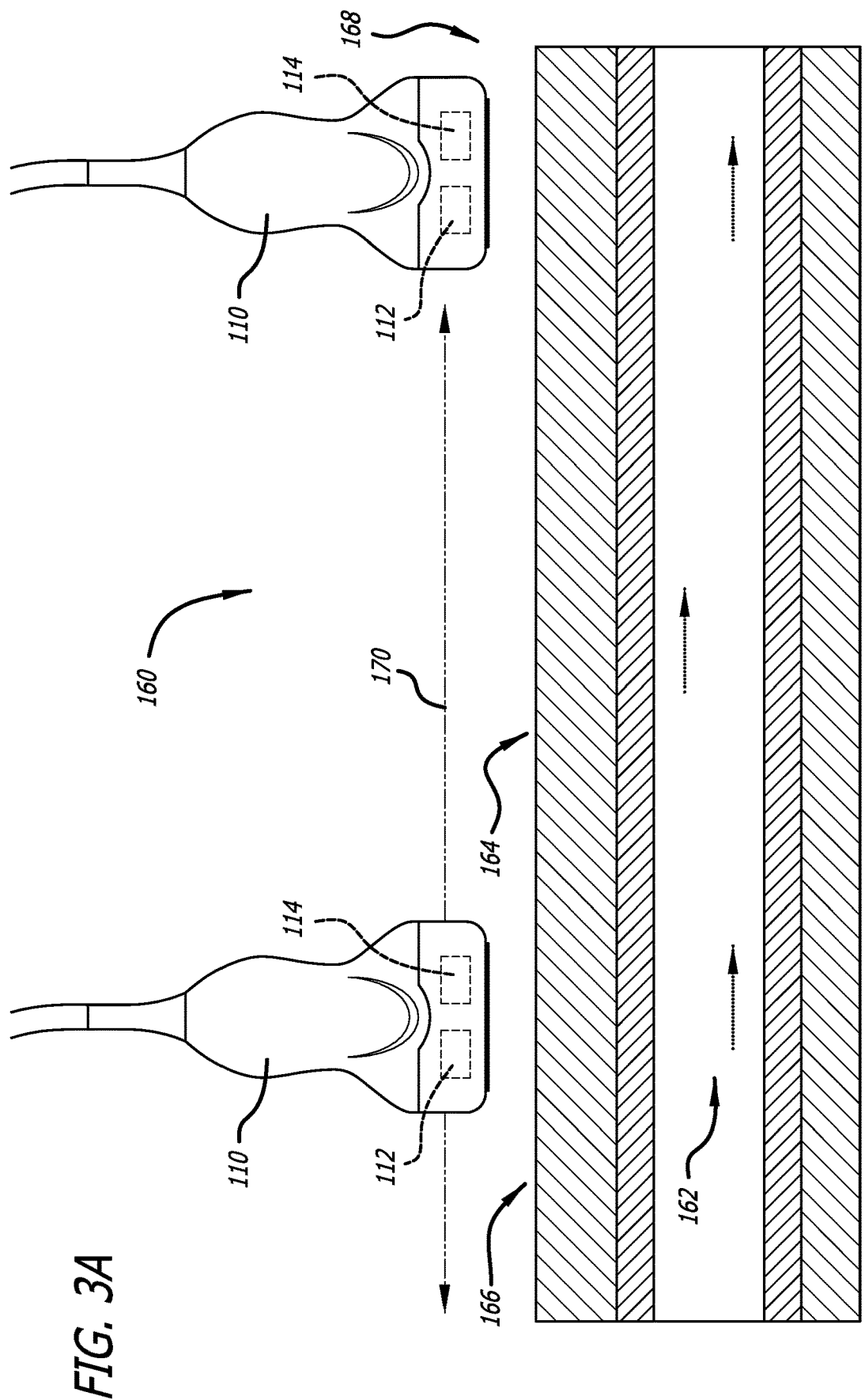

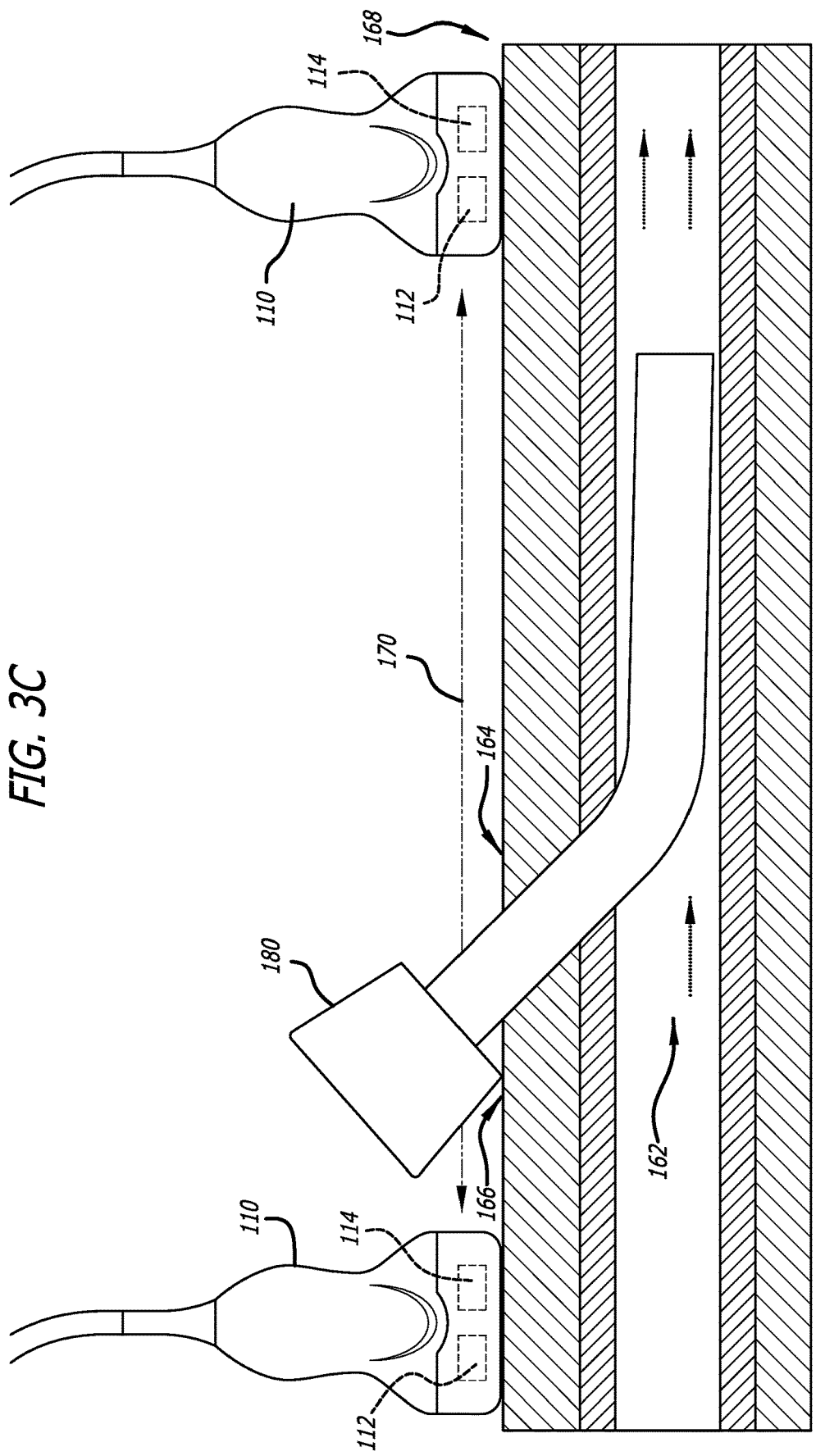

ULTRASOUND IMAGING SYSTEM

BACKGROUND

Current methods for placing a vascular access device include placing a vascular access device occupying no more than 45% of a target vessel. Ultrasound imaging systems are used to detect vascular access device occupancy within the target vessel. However, these methods do not ensure that blood flow through the vessel is not compromised once the vascular access device is placed within the vessel. It would be beneficial to the clinician and the patient to have an ultrasound imaging system that may be used to image the target vessel, detect occupancy of the vascular access device within the target vessel, and assess blood flow through the target vessel after the vascular access device has been placed. Disclosed herein is an ultrasound imaging system and method of use that address the foregoing.

SUMMARY

Disclosed herein is an ultrasound imaging system configured to assess the impact of placement of a vascular access device on fluid flow through a target vessel. The ultrasound imaging system includes an ultrasound probe having an ultrasound array configured to capture one or more ultrasound images of the target vessel and a Doppler array configured to detect the fluid flow through a region of interest of the target vessel. The ultrasound imaging system further includes a console in communication with each of the ultrasound array and the Doppler array, the console configured to determine the region of interest of the target vessel.

In some embodiments, the console is configured to determine the total cross sectional area of the target vessel using one or more ultrasound images.

In some embodiments, the console assesses the impact of the vascular access device on fluid flow through the target vessel by comparing a first flow rate value of the region of interest before placement of the vascular access device with a second flow rate value of the region of interest after placement of the vascular access device.

In some embodiments, the first flow rate value and the second flow rate value are detected distal an insertion site of the vascular access device.

In some embodiments, the impact of the vascular access device on fluid flow through the target vessel is expressed as a percent of the total cross sectional area of the target vessel.

In some embodiments, the console includes one or more processors, an energy source, non-transitory computer readable medium and a plurality of logic modules that when activated by the process are configured to perform operations including tracking the ultrasound probe within the target area, receiving the one or more ultrasound images from the ultrasound array, determining the target vessel and the cross sectional area of the target vessel within the one or more ultrasound images, receiving flow rate data from the Doppler array, determining the flow rate through the region of interest and generating a flow rate value, determining the region of interest, comparing a first flow rate value with a second flow rate value, and generating and overlaying a flow rate value icon on the one or more ultrasound images.

In some embodiments, the user selects the region of interest on a display in communication with the console.

In some embodiments, the console is configured to detect vascular access device occupancy within the target vessel, generate a vascular access device occupancy value, and compare the vascular access device value with the impact of the vascular access device on fluid flow through the target vessel as expressed as the percent of the total cross sectional area of the target vessel.

Also disclosed herein is a method of assessing fluid flow through a target vessel before and after placement of a vascular access device including imaging the target vessel within a target area using an ultrasound imaging system, identifying a region of interest along the target vessel, assessing fluid flow through the region of interest, placing a vascular access device within the target vessel, imaging the target vessel after placement of the vascular access device within the target vessel, and assessing fluid flow through the region of interest after placement of the vascular access device within the target vessel.

In some embodiments, imaging the target vessel within the target area using the ultrasound imaging system includes imaging the target vessel with an ultrasound probe having an ultrasound array and a Doppler array, each in communication with a console.

In some embodiments, imaging the target vessel within the target area using the ultrasound imaging system includes imaging the target vessel at a first location within the target area.

In some embodiments, identifying the region of interest along the target vessel includes the console automatically identifying the region of interest.

In some embodiments, identifying the region of interest along the target vessel includes a user identifying the region of interest on a display in communication with the console.

In some embodiments, assessing fluid flow through the region of interest includes the detecting a first flow rate value through the region of interest.

In some embodiments, detecting the first flow rate through the region of interest includes detecting a first flow rate value at the first location within the target area.

In some embodiments, detecting the first flow rate value at the first location within the target area includes the first location being distal an insertion site.

In some embodiments, imaging the target vessel after placement of the vascular access device within the target vessel includes imaging the target vessel within the target area.

In some embodiments, imaging the target vessel within the target area includes imaging the target vessel at the first location distal the insertion site.

In some embodiments, assessing fluid flow through the region of interest after placement of the vascular access device within the target vessel includes detecting a second flow rate value through the region of interest after the vascular access device has been placed within the target vessel.

In some embodiments, detecting the second flow rate value includes detecting the second flow rate value at the first location distal the insertion site.

In some embodiments, assessing fluid flow through the region of interest after placement of the vascular access device within the target vessel includes comparing the second flow rate value with the first flow rate value to confirm fluid flow through the target vessel has not been compromised by the placement of the vascular access device.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIGS. 3A-3C illustrate a cross sectional view of an exemplary method of assessing blood flow through a target vessel before and after vascular access device insertion, in accordance with some embodiments.

DESCRIPTION

Figure 1:
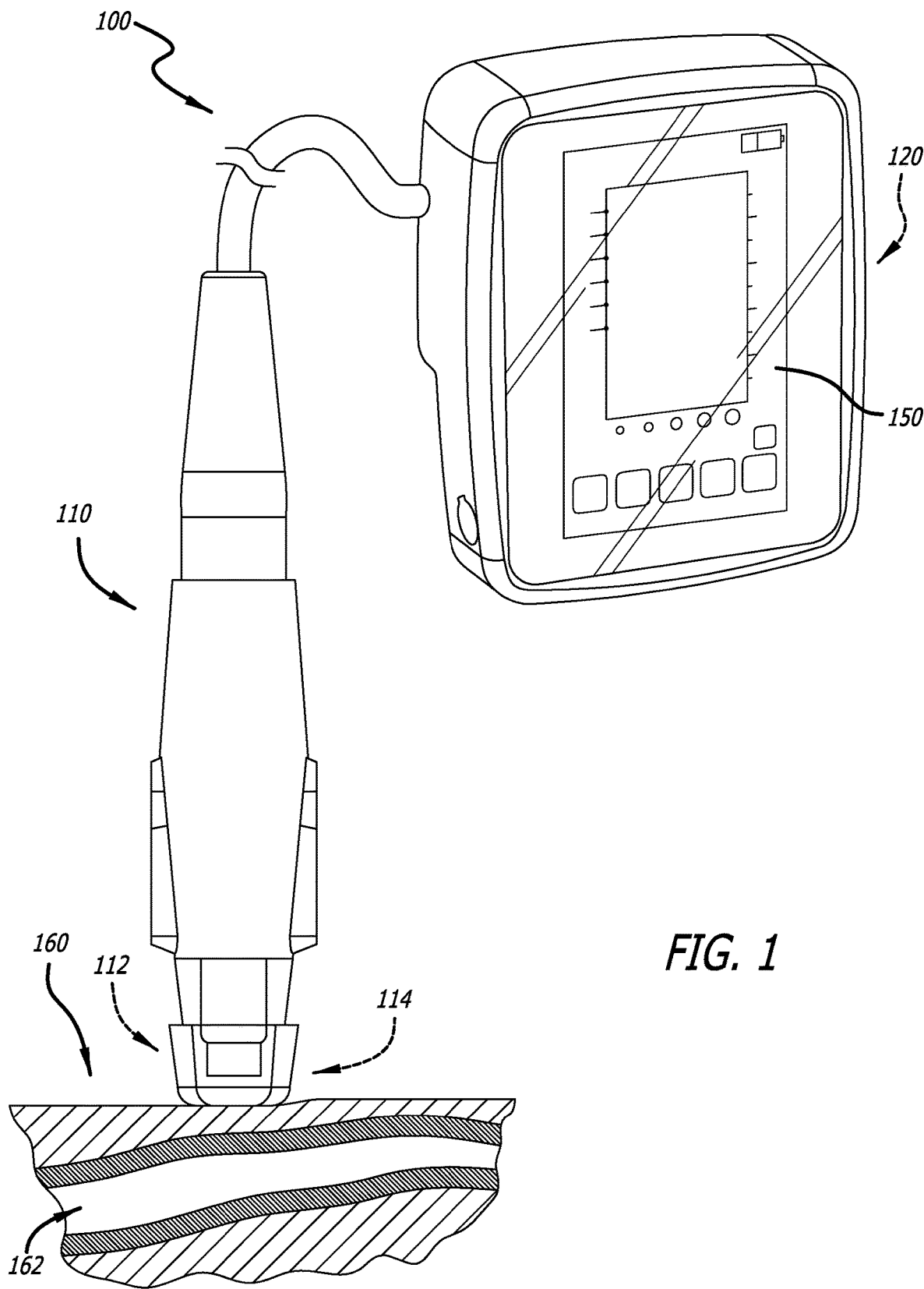
FIG. 1 illustrates a perspective view of an ultrasound imaging system, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Unless defined otherwise, all technical and scientific terms used herein have the same meaning as commonly understood by those of ordinary skill in the art.

FIG. 1 illustrates a perspective view of an ultrasound imaging system 100, in accordance with some embodiments. In some embodiments, the ultrasound imaging system 100 includes an ultrasound probe 110 in communication with a console 120. In some embodiments, the console 120 may be in communication with a display 150 configured to display one or more ultrasound images. In some embodiments, the ultrasound probe 110 includes an ultrasound array 112 and a Doppler array 114. In some embodiments, the ultrasound array 112 may be configured to capture one or more images of a target vessel 162 within a target area 160 and communicate the one or more images to the console 120. In some embodiments, the Doppler array 114 may be configured to detect fluid flow including flow rate through the target vessel 162 and communicate the detected fluid flow data to the console 120. In some embodiments, the ultrasound array 112 may be configured to simultaneously operated at the same time as the Doppler array 114, or the ultrasound array 112 may be continuously running and the Doppler array 114 may be configured to be selectably switched on, depending on a user's imaging needs.

Figure 2:
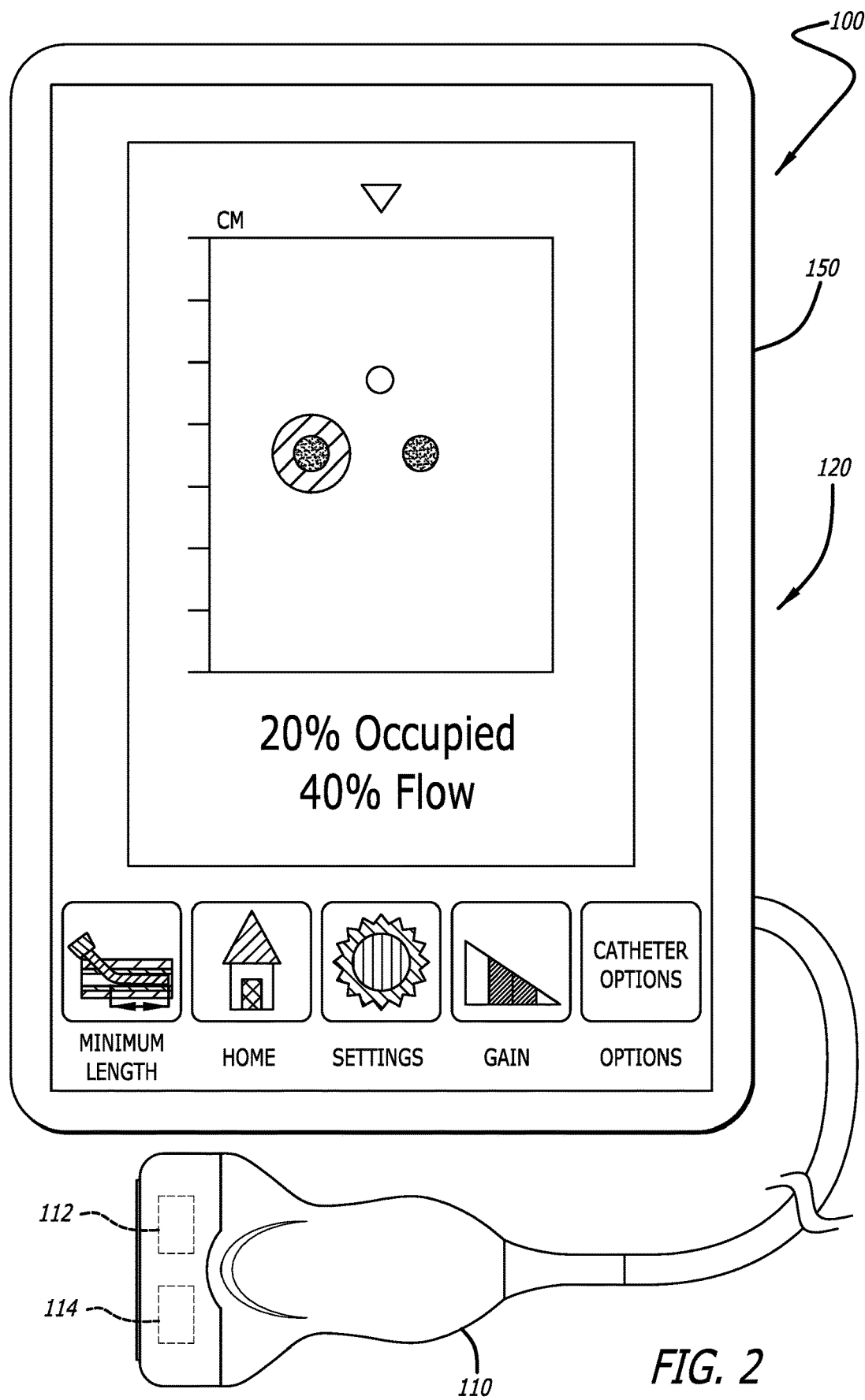
FIG. 2 illustrates a perspective view of a display of the ultrasound imaging system, in accordance with some embodiments.

FIG. 2 illustrates a perspective view of the display 150 of the ultrasound imaging system 100, in accordance with some embodiments. In some embodiments, the console 120 may be coupled to the display 150. In some embodiments, the display 150 may include a touch screen display. In some embodiments, the display 150 may be configured to show the one or more ultrasound images captured from the ultrasound array 112 and may be configured to overlay the data received from the Doppler array 114 onto the one or more ultrasound images. In some embodiments, a user may select, on the display 150, a region of interest of the target vessel 162. In some embodiments, the region of interest may include the target vessel 162 or a portion of the target vessel 162. In some embodiments, when the region of interest is selected, the display 150 may display ultrasound images from the region of interest including fluid flow data from the Doppler array 114, as will be described in more detail herein. In some embodiments, the display 150 may be configured to display a variety of icons including a target vessel occupancy icon, a fluid flow rate icon, a region of interest icon, or the like. In some embodiments, the Doppler array 114 may be able to be turned on or turned off including from the display 150 or from the ultrasound probe 110. In some embodiments, the variety of icons may include different shapes, different colors, or different sizes. In some embodiments, the variety of icons may change in response to data received by the console 120. For example, in some embodiments, the variety of icons may change in response to an increase or decrease in fluid flow rate.

Figure 3B:
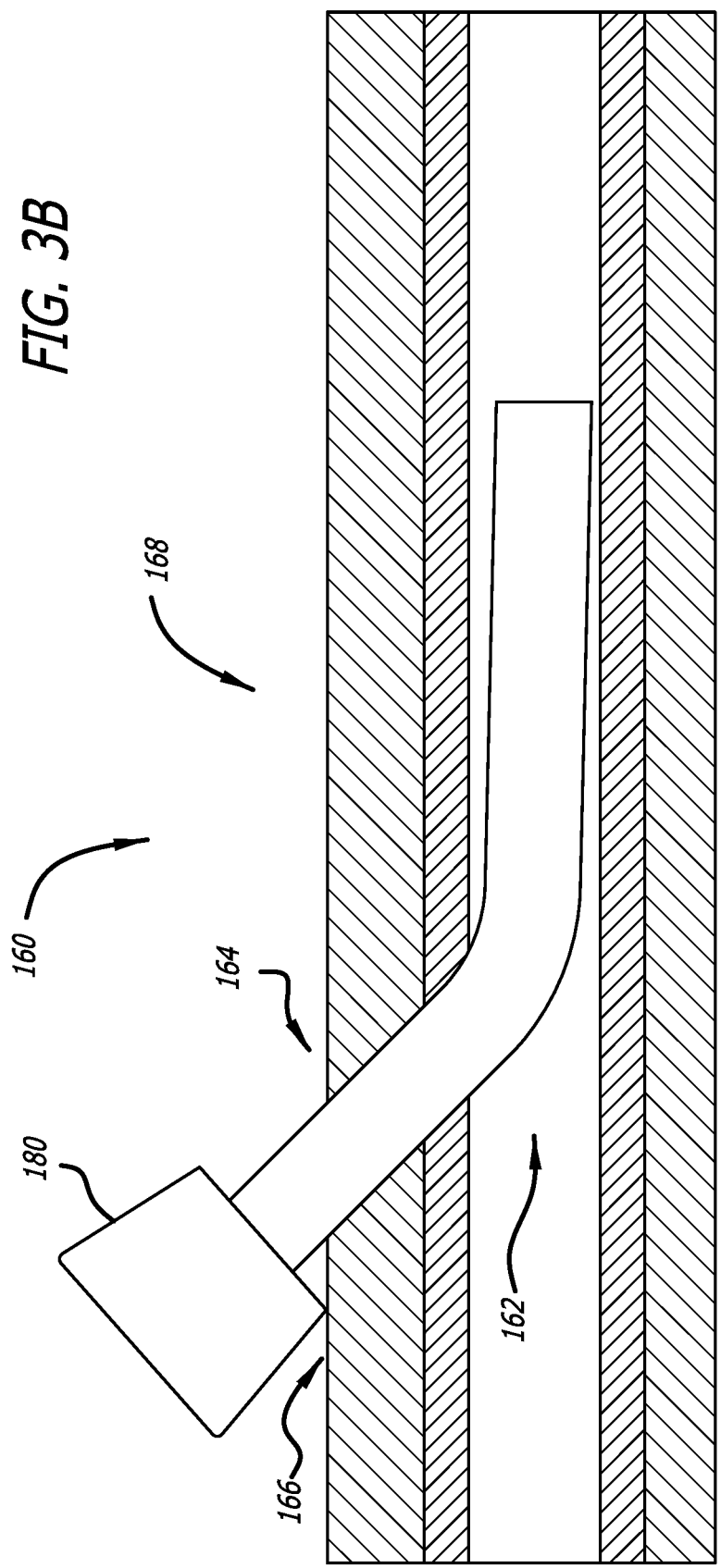

FIGS. 3A-3C illustrate a cross sectional view of an exemplary method of assessing fluid flow through the target vessel 162 before and after insertion of the vascular access device 180, in accordance with some embodiments. In some embodiments, the ultrasound probe 110 may be used to image the target vessel 162 within the target area 160. The ultrasound probe 110 may be brought to a skin surface within the target area 160. The ultrasound array 112 may be used to capture one or more images of the target vessel 162. The Doppler array 114 may be used to assess the blood flow through the target vessel 162. In some embodiments, the ultrasound probe 110 may be configured to capture one or more images of the target vessel 162 along an entire first length 170, wherein the first length 170 includes an insertion site 164. In some embodiments, the ultrasound probe 110 may be configured to image the target vessel 162 proximal the insertion site 164 and distal the insertion site 164. In some embodiments, the first length 170 may include adjacent or proximal to the insertion site 164, including a first side 166 of the insertion site 164 and a second side 168 of the insertion site 164.

As illustrated in FIG. 3B, once the target vessel 162 has been imaged, the vascular access device 180 may be placed within the target vessel 162 at the insertion site 164. In some embodiments, a portion of the vascular access device 180 may reside within the target vessel 162 and impede a portion of flow through the target vessel 162. With the vascular access device 180 placed within the target vessel 162, the target vessel 162 may be imaged along the first length 170 by the ultrasound probe 110, including proximal the insertion site 164 and distal the insertion site 164. The Doppler array 114 may be used to detect fluid flow through the target vessel 162 including fluid flow proximal the insertion site 164 on the first side 166 and fluid flow distal the insertion site 164 on the second side 168. In some embodiments, the console 120 may be configured to assess the fluid flow through the target vessel 162 to determine the impact the placement of the vascular access device 180 within the target vessel 162 has on fluid flow through the target vessel 162 (e.g., if fluid flow is significantly disrupted with the vascular access device 180 placed therein). In some embodiments, the console 120 may be configured to determine the cross sectional area of the target vessel 162 and display one or more flow rate values of the flow rate through the region of interest including around the vascular access device 180 as a percent of the total cross sectional area of the target vessel 162.

Figure 4:
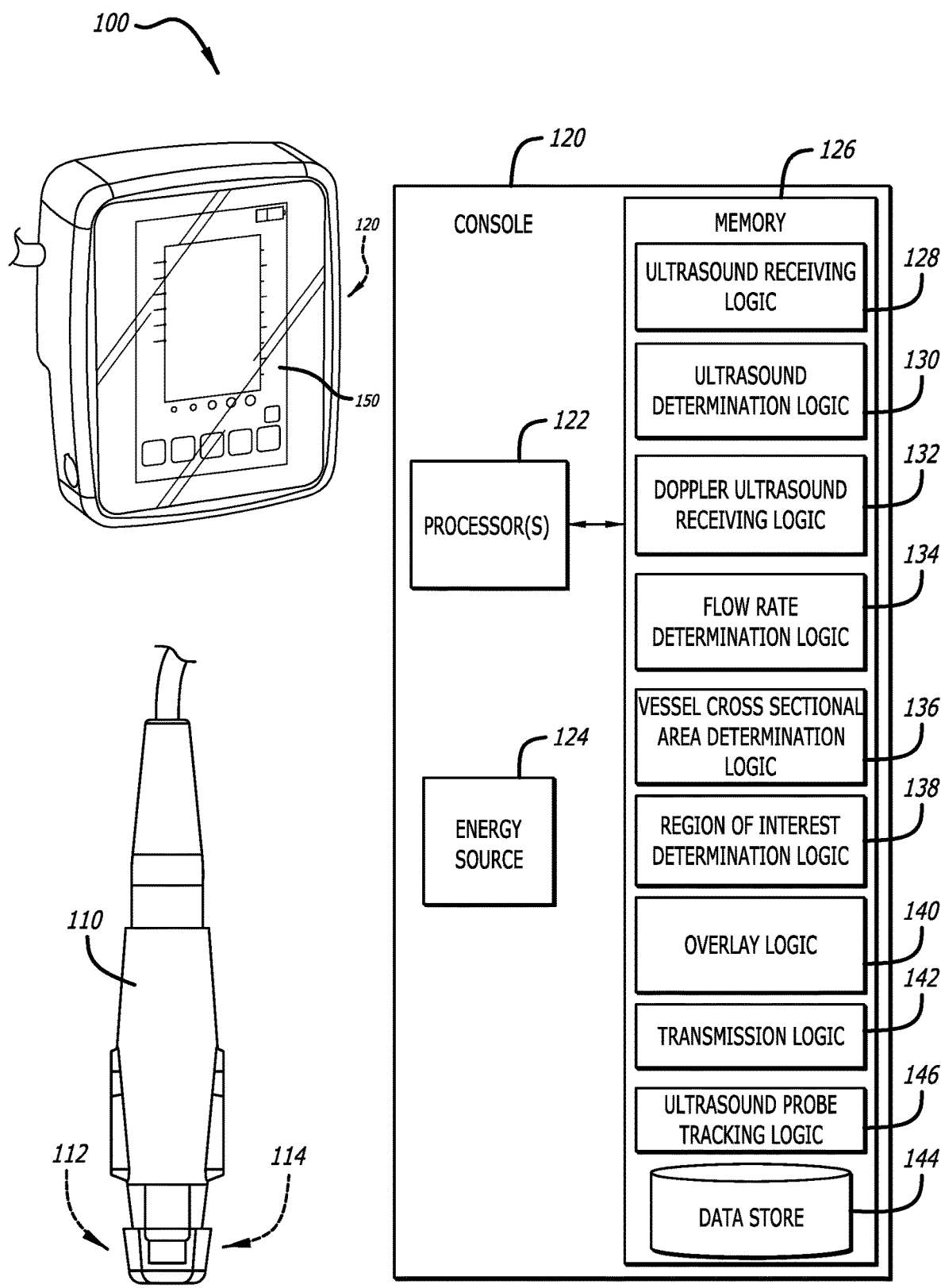
FIG. 4 illustrates a block diagram of a console of the ultrasound imaging system, in accordance with some embodiments.

FIG. 4 illustrates a block diagram of the console 120, in accordance with some embodiments. In some embodiments, the console 120 may be in communication with each of the ultrasound probe 110 and the display 150. In some embodiments, the console 120 may be coupled to the ultrasound probe 110, wired to the ultrasound probe 110, may be wired to the display 150, coupled to the display 150 or may be in wireless communication with each of the ultrasound probe 110 and the display 150, or a combination thereof. In some embodiments, the console 120 may include one or more processors 122, an energy source 124, non-transitory computer readable medium ("memory") 126, and a plurality of logic modules. In some embodiments, the plurality of logic modules may include one or more of: ultrasound receiving logic 128, ultrasound determination logic 130, Doppler array receiving logic 132, flow rate determination logic 134, vessel cross sectional area determination logic 136, region of interest determination logic 138, overlay logic 140, a transmission logic 142, an ultrasound probe tracking logic 146, and a data store 144.

In some embodiments, the ultrasound receiving logic 128 may be configured to receive the one or more ultrasound images captured from the ultrasound array 112 on the ultrasound probe 110. In some embodiments, the ultrasound receiving logic 128 may be configured to generate a time of day value that may be associated with each received ultrasound image. In some embodiments, the ultrasound receiving logic 128 may be configured to receive the coordinates of the ultrasound probe 110 within the target area 160 when the ultrasound array 112 acquired the one or more ultrasound images. In some embodiments, the ultrasound determination logic 130 may be configured to determine and define the target vessel 162 within the one or more ultrasound images. In some embodiments, the Doppler array receiving logic 132 may be configured to receive flow rate data (e.g., Doppler ultrasound values) from the Doppler array 114 including the flow rate through the target vessel 162 and the coordinates of the ultrasound probe 110 within the target area 160 when the Doppler array 114 acquired the flow rate data.

In some embodiments, the flow rate determination logic 134 may be configured to use the flow rate data acquired by the Doppler array 114 at a first time point to determine the flow rate through the region of interest and generate one or more flow rate values corresponding to the flow rate through the region of interest. In some embodiments, the flow rate determination logic 134 may be configured to generate an average flow rate value for the flow rate along the first length 170 or may be configured to generate a flow rate value for each coordinate within the target area 160 where the Doppler array 114 acquired flow rate data. In some embodiments, the flow rate determination logic 134 may compare the flow rate data (e.g., flow rate values) acquired from pre-insertion of the vascular access device 180 at a first time point to flow rate data (e.g., flow rate values) post-insertion of the vascular access device 180 at a second time point. For example, the flow rate determination logic 134 may be configured to generate a first flow rate value from flow rate data received at a first location distal the insertion site 164 pre-insertion of the vascular access device 180 and then generate a second flow rate value from flow rate data received at the first location distal the insertion site 164 post-insertion of the vascular access device 180.

In some embodiments, the flow rate determination logic 134 may compare the flow rate data including flow rate values from the same coordinates within the target area 160. In some embodiments, the flow rate determination logic 134 may be configured to compare historical flow rate data of the region of interest to presently acquired flow rate data. For example, the flow rate determination logic 134 may compare historical flow rate data of the region of interest to presently acquired flow rate data pre-insertion of the vascular access device 180 and post-insertion of the vascular access device 180.

In some embodiments, the vessel cross sectional area determination logic 136 may be configured to determine the cross sectional area of the target vessel 162 from one or more ultrasound images imaged using the ultrasound array 112. In some embodiments, the vessel cross sectional area determination logic 136 may be configured to generate a total cross sectional area value. In some embodiments, the vessel cross sectional area determination logic 136 determines the outer region of the target vessel 162 which provides the total percentage possible in terms of fluid flow through the cross section of the target vessel 162. In some embodiments, the vessel cross sectional area determination logic 136 may be configured to compare the flow rate values to the total cross sectional area value to determine what percentage of the total cross sectional area of the target vessel 162 is having fluid flow therethrough.

In some embodiments, the vessel cross sectional area determination logic 136 may be configured to express the fluid flow rate through the region of interest as a percentage of the total cross sectional area of the target vessel 162 or as a flow rate ratio. In some embodiments, the vessel cross sectional area determination logic 136 may be configured to compare the flow rate values after placement of the vascular access device 180 with flow rate values before the placement of the vascular access device 180. In some embodiments, the vessel cross sectional area determination logic 136 may be configured to determine that fluid flow through the target vessel 162 has been significantly compromised by comparing flow rate values after placement of the vascular access device 180 with a flow rate value threshold to determine if fluid flow through the target vessel 162 has been compromised. In some embodiments, the flow rate value threshold may be user selected or automatically determined using historical flow rate values including flow rate values before placement of the vascular access device 180.

In some embodiments, the region of interest determination logic 138 may be configured to automatically determine the region of interest. In some embodiments, the region of interest determination logic 138 may be configured to use detected anatomical targets in proximity to the target vessel 162 in order to determine the region of interest. In some embodiments, the region of interest determination logic 138 may be configured to be determined using user input (e.g., the user may select the region of interest on the display 150 or the like). In some embodiments, the region of interest determination logic 138 may be configured to be determined using historical data (e.g., previous ultrasound images) to determine the region of interest. In some embodiments, the region of interest determination logic 138 may be configured to be determined using a fixed distance from the insertion site 164.

In some embodiments, the overlay logic 140 may be configured to generate a flow rate data icon and overlay the flow rate data received from the Doppler array 114 or the flow rate data icon on the one or more ultrasound images received from the ultrasound array 112. In some embodiments, the flow rate data icon may have various shapes, sizes, or colors, wherein each shape, size, or color may correspond to a specific flow rate value (e.g., a heat map). In some embodiments, overlay logic 140 may be configured to match the coordinates of the ultrasound images and the coordinates of the flow rate data to overlay the flow rate data or flow rate data icon over the proper location of the region of interest in the one or more ultrasound images.

In some embodiments, the transmission logic 142 may be configured to transmit the one or more ultrasound images to the display 150. In some embodiments, the transmission logic 142 may be configured to transmit the overlay of the Doppler ultrasound data on the one or more ultrasound images to the display 150. In some embodiments, the transmission logic 142 may be configured to transmit the fluid flow rate through the region of interest as a percentage of the total cross sectional area of the target vessel 162 to the display 150.

In some embodiments, the ultrasound probe tracking logic 146 may be configured to track the coordinates of the ultrasound probe 110 within the target area 160. In some embodiments, the ultrasound probe tracking logic 146 may be configured to always be tracking the coordinates of the ultrasound probe 110 within the target area 160 or the ultrasound probe tracking logic 146 may be configured to track the coordinates of the ultrasound probe 110 only when the ultrasound probe tracking logic 146 records the ultrasound array 112 or the Doppler array 114 is activated.

In some embodiments, the data store 144 may be configured to store historical flow rate data from the target vessel 162. In some embodiments, the data store 144 may be configured to store each of the one or more ultrasound images acquired from the ultrasound array 112 and the corresponding data from the Doppler array 114. In some embodiments, the data store 144 may be configured to store the ultrasound images and Doppler ultrasound data as {(ultrasound image coordinates), (time of day value), (Doppler ultrasound coordinates), (flow rate value)} or the like.

In some embodiments, the console 120 may be configured to measure, detect, or predict target vessel occupancy of the vascular access device 180 including an assessment of the vascular access device 180 to target vessel 162 ratio. In some embodiments, the console 120 may be configured to generate a vascular access device occupancy value or the vascular access device occupancy ratio (e.g., a ratio of the cross sectional area of the vascular access device 180 to the cross sectional area of the target vessel 162). In some embodiments, the console 120 may be configured to compare the detected or predicted vessel occupancy, or vascular access device occupancy ratio with the flow rate through the region of interest expressed as a percent of the total cross sectional area of the target vessel 162 to confirm proper vessel occupancy.

Figure 5:
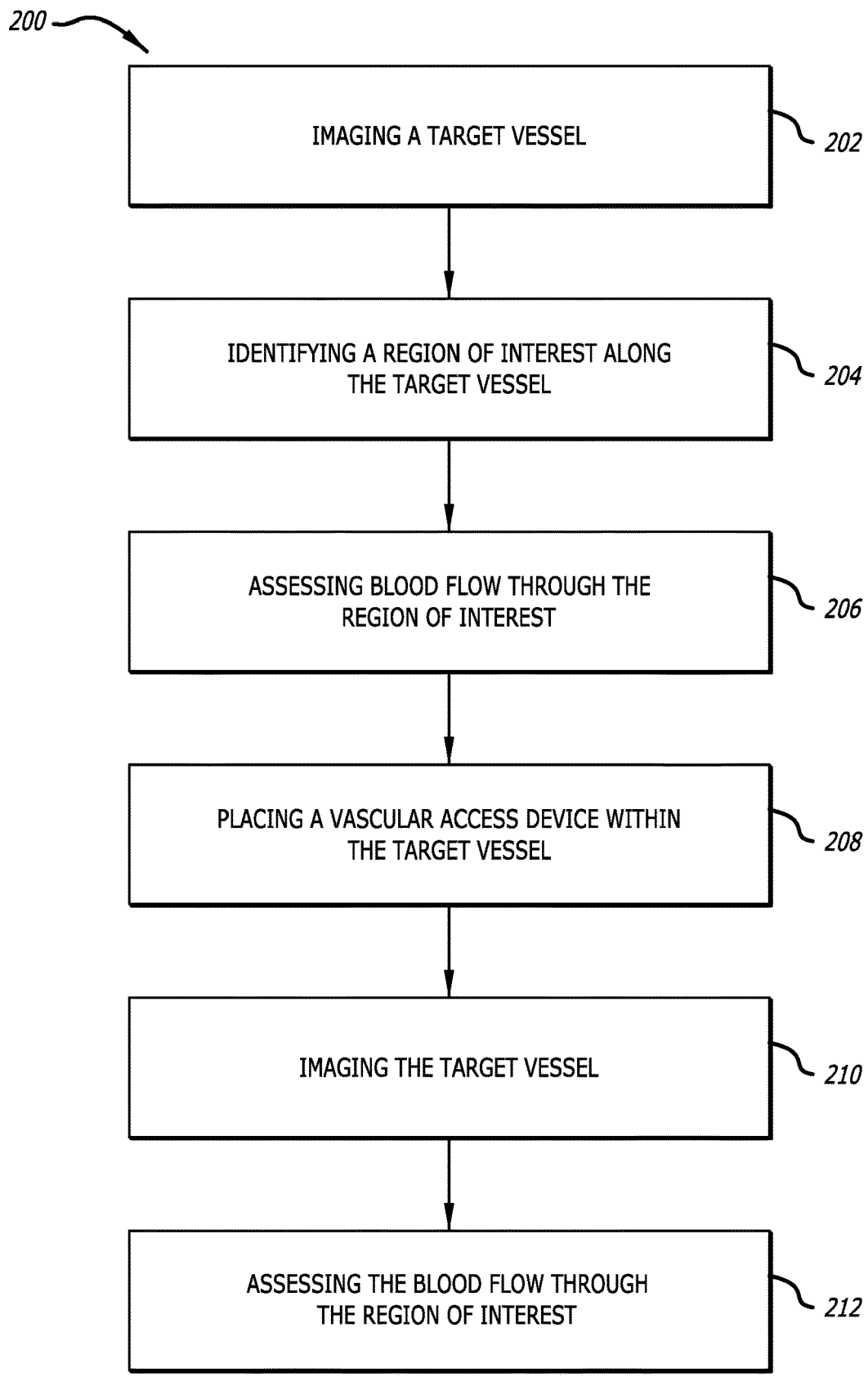
FIG. 5 illustrates a flow chart of an exemplary method of placing a vascular access device, in accordance with some embodiments.

FIG. 5 illustrates a flow chart of an exemplary method 200 of placing a vascular access device 180 within a target vessel 162, in accordance with some embodiments. In some embodiments, the method 200 includes imaging a target vessel 162 in a target area 160 using an ultrasound imaging system 100 (block 202). In some embodiments, imaging the target vessel 162 within the target area 160 using the ultrasound imaging system 100 includes imaging the target vessel 162 using the ultrasound probe 110 having the ultrasound array 112 and the Doppler array 114, each in communication with the console 120. In some embodiments, imaging the target vessel 162 includes the console 120 transmitting the one or more ultrasound images to the display 150. In some embodiments, imaging the target vessel 162 in a target area 160 using the ultrasound imaging system 100 includes imaging the target vessel 162 at a first location within the target area 160. In some embodiments, imaging the target vessel 162 in the target area 160 includes using the ultrasound imaging system 100 to image the target vessel 162 along the first length 170.

In some embodiments, the method 200 includes identifying a region of interest along the target vessel 162 (block 204). In some embodiments, identifying the region of interest along the target vessel 162 includes the user identifying the region of interest along the target vessel 162. In some embodiments, identifying the region of interest along the target vessel 162 includes the user selecting the region of interest on the display 150. In some embodiments, identifying the region of interest along the target vessel 162 includes the console 120 automatically identifying the region of interest along the target vessel 162. In some embodiments, the console 120 automatically identifying the region of interest along the target vessel 162 includes the console 120 using anatomical targets within the target area 160 to identify the region of interest along the target vessel 162. In some embodiments, identifying the region of interest includes the console 120 selecting the coordinates of the region of interest within the target area 160.

In some embodiments, the method 200 includes assessing fluid flow through the region of interest (block 206). In some embodiments, assessing fluid flow through the region of interest includes the console 120 using data received from the Doppler array to determine the fluid flow through the target vessel 162. In some embodiments, assessing fluid flow through the region of interest includes detecting a first flow rate value through the region of interest. In some embodiments, detecting the first flow rate value through the region of interest includes detecting the first flow rate value at the first location within the target area 160. In some embodiments, the first location may be distal the insertion site 164. In some embodiments, assessing fluid flow through the region of interest includes the console 120 transmitting the fluid flow rate to the display 150 as a percent of the total cross sectional area of the target vessel 162. In some embodiments, assessing fluid flow through the region of interest occurs simultaneously with imaging the target vessel 162.

In some embodiments, the method 200 includes placing a vascular access device 180 within the target vessel 162 (block 208). In some embodiments, placing the vascular access device 180 within the target vessel 162 includes placing the vascular access device 180 into the target vessel 162 through an insertion site 164 within the target area 160. In some embodiments, placing the vascular access device 180 within the target vessel 162 includes using the Seldinger technique to place the vascular access device 180 within the target vessel 162. In some embodiments, placing the vascular access device 180 within the target vessel 162 includes slidably inserting the vascular access device 180 into the target vessel 162.

In some embodiments, the method 200 includes imaging the target vessel 162 after placement of the vascular access device 180 within the target vessel 162 (block 210). In some embodiments, imaging the target vessel 162 after placement of the vascular access device 180 within the target vessel 162 includes using the ultrasound probe 110 having the ultrasound array 112 and the Doppler array 114 to image the target vessel 162. In some embodiments, imaging the target vessel 162 includes imaging the target vessel 162 along the first length 170 within the target area 160. In some embodiments, imaging the target vessel 162 includes imaging the target vessel 162 along the first length 170 including the first side 166 of the insertion site 164 and the second side 168 of the insertion site 164. In some embodiments, imaging the target vessel 162 includes using the Doppler array 114 to image the target vessel 162 at the same coordinates as previously captured ultrasound images within the target area 160. In some embodiments, imaging the target vessel 162 after placement of the vascular access device 180 within the target vessel 162 includes imaging the target vessel 162 at the first location distal the insertion site 164. In some embodiments, imaging the target vessel 162 after placement of the vascular access device 180 within the target vessel 162 includes imaging the target vessel 162 at a first side 166 of the insertion site 164 and a second side 168 of the insertion site 164.

In some embodiments, the method 200 includes assessing the fluid flow through the region of interest after placement of the vascular access device 180 within the target vessel 162 (block 212). In some embodiments, assessing the fluid flow through the region of interest after placement of the vascular access device 180 within the target vessel 162 includes the console 120 using the data received from the Doppler array 114 to determine the flow rate through the target vessel 162 including through the region of interest with the vascular access device 180 placed therein. In some embodiments, assessing the fluid flow through the region of interest after placement of the vascular access device 180 within the target vessel 162 includes assessing fluid flow while simultaneously imaging the target vessel 162.

In some embodiments, assessing the fluid flow through the region of interest after placement of the vascular access device 180 within the target vessel 162 includes detecting a second flow rate value through the region of interest after the vascular access device has been placed within the target vessel 162. In some embodiments, detecting the second flow rate value includes detecting the second flow rate value at the first location distal the insertion site 164. In some embodiments, assessing fluid flow through the region of interest after placement of the vascular access device 180 within the target vessel 162 include comparing the second flow rate value with the first flow rate value to confirm fluid flow through the target vessel 162 has not be compromised by the placement of the vascular access device 180 within the target vessel 162. In some embodiments, assessing the fluid flow through the region of interest includes the console 120 communicating the fluid flow rate through the target vessel 162 after placement of the vascular access device 180 to the display 150 as a percent of the total cross sectional area of the target vessel 162.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A method, comprising:
    imaging a target vessel within a target area using an ultrasound imaging system;
    displaying an image of the target vessel on a display of the ultrasound imaging system;
    automatically selecting a portion of the target vessel as a region of interest along the target vessel via logic operations of the ultrasound imaging system using anatomical targets in proximity to the target vessel within the target area;
    obtaining first fluid flow rate data from a doppler array of the ultrasound imaging system indicating a first fluid flow rate value through the region of interest prior to placement of a vascular access device within the target vessel;
    imaging the target vessel after placement of the vascular access device within the target vessel;
    obtaining second fluid flow rate data from the doppler array indicating a second fluid flow rate value through the region of interest after placement of the vascular access device within the target vessel; and
    detecting that fluid flow through the target vessel has been compromised based on results of comparing the second fluid flow rate value with a flow rate value threshold.

2. The method according to claim 1, wherein:
    the ultrasound imaging system includes an ultrasound array and the Doppler array, and the ultrasound array and the doppler array are each in communication with a console.

3. The method according to claim 1, wherein imaging the target vessel within the target area using the ultrasound imaging system includes imaging the target vessel at a first location within the target area.

4. The method according to claim 3, wherein the first fluid flow rate data from the doppler array indicates the first fluid flow rate value at the first location within the target area.

5. The method according to claim 4, wherein the first location is distal an insertion site of the vascular access device.

6. The method according to claim 5, wherein imaging the target vessel after placement of the vascular access device within the target vessel includes imaging the target vessel within the target area.

7. The method according to claim 6, wherein imaging the target vessel within the target area includes imaging the target vessel at the first location distal the insertion site.

8. The method according to claim 7, wherein the second fluid flow rate data from the Doppler array indicates the second fluid flow rate value at the first location distal the insertion site.

9. The method according to claim 7, further comprising:
generating a flow rate data icon overlay including the first fluid flow rate data, and
matching coordinates of the image of the target vessel with coordinates of the flow rate data icon overlay to locate the flow rate data icon overlay at the region of interest.

10. The method according to claim 1, wherein identifying the region of interest along the image of the target vessel includes receiving user input by the ultrasound imaging system indicating an identification of the region of interest.

11. The method according to claim 1, wherein identifying the region of interest along the image of the target vessel includes using historical data from previously acquired ultrasound images of the target area to identify the region of interest.

12. The method according to claim 1, wherein identifying the region of interest along the image of the target vessel includes using fixed distance from an insertion site to identify the region of interest.

13. The method according to claim 1, further comprising:
determining a total cross-section area value of the target vessel from the image of the target vessel, and
determining a vascular access device occupancy percentage based on the total cross-section area value and a cross-sectional area value of the vascular access device.

* * * * *